United States Patent Office 3,363,049
Patented Jan. 9, 1968

3,363,049
JOINTS FOR ELECTRIC CABLES
Cyril Henry Gosling, London, David Glick, Rainhill, near Liverpool, Alan Leslie Powell, Bexleyheath, and William Young Murray, Prescot, England, assignors to British Insulated Callender's Cables Limited, London, England, a British company
Filed Oct. 21, 1965, Ser. No. 499,955
Claims priority, application Great Britain, Oct. 23, 1964, 43,355/64
14 Claims. (Cl. 174—85)

ABSTRACT OF THE DISCLOSURE

A corrosive resistant joint enclosure enclosing a joint between metal sheathed fluid impregnated electric power cables. A fluid-tight enclosure is transversely divided into a central part, which may be left exposed for increased heat dissipation, and end parts sealed to the cable sheaths and a central part wherein the end parts are electrically insulated from the central part. Supplementary enclosures for the end parts are provided, one of which may carry a gland for a two-conductor cross-bonding cable, one conductor of which is connected to the cable sheath at the same end of the joint and the other conductor of which is connected by a lead passing through the central part to the sheath to the cable sheath at the other end of the joint.

---

Figure 1:
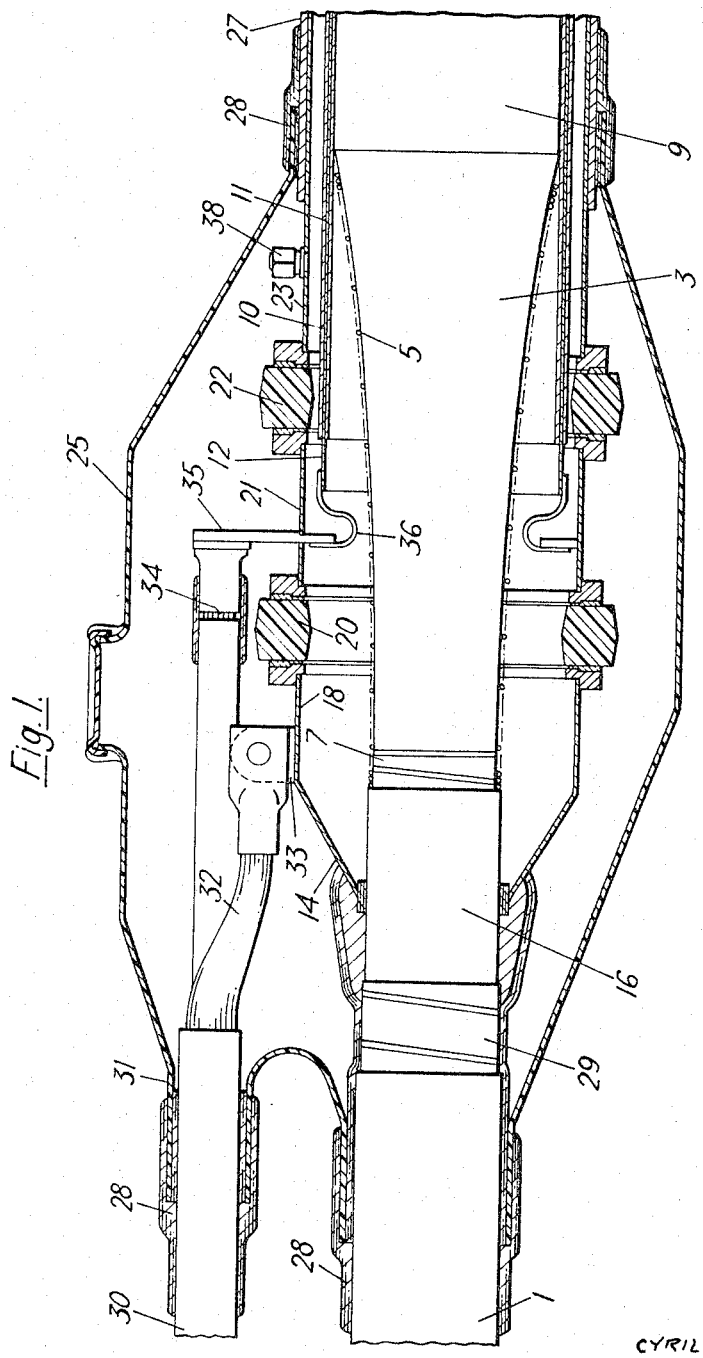

This invention relates to joints for metal sheathed fluid impregnated power cables and has as its principal object the provision of a joint structure having reduced thermal resistance, measured radially from the conductor axis, in the region of the jointing ferrule, whereby the rate of natural cooling of the cable conductors and ferrule at the joint is increased and/or heat can be extracted more efficiently from the joint enclosure by means of a heat exchanger applied to the joint enclosure in this region.

Joints for metal sheathed fluid impregnated power cables comprise as an essential feature a fluid-tight enclosure for the cable impregnant (hereinafter referred to as the fluid-tight enclosure) which surrounds the joint between the cable conductors and is sealed to the sheaths of the lengths of cable connected at the joint. The fluid-tight enclosure is normally surrounded by a further enclosure, generally filled with insulating compound.

The functions of this further enclosure are similar to the functions of the covering and armouring applied to lead cable sheaths, namely to insulate the fluid-tight enclosure electrically from the surrounding soil if required and to provide mechanical protection and protection against corrosion.

In the joint in accordance with the present invention, the fluid-tight enclosure is divided transversely into at least three parts including a central part surrounding the joint between the cable conductors and electrically insulated from the sheaths of the cable lengths interconnected at the joint by end parts sealed to the central part and to the cable sheaths. Supplementary enclosures, each sealed to one of the cables and to the adjacent end of the central part, are provided for insulating and protecting the end parts of the fluid-tight enclosure but the remainder of the central part not protected by the supplementary enclosure is made corrosive resistant, that is to say resistant to the corrosive influences of the atmosphere or of the soil. For this purpose the central part may either be made of a material that is resistant to corrosion or be provided with a corrosion resistant covering. The enclosures may be of insulating material or of conducting material or partly of conducting material and partly of insulating material. When they are wholly or partly of conducting material it is preferable that they should be filled with an insulating compound. In all cases they must also be made corrosion resistant as defined above.

The invention is especially applicable to joints, for use in a cross-bonded system, in which the sheaths of the two lengths of cable that are interconnected at the joint are insulated from each other and each connected to one of two bonding conductors, usually the conductors of two single core bonding cables or the two conductors of one concentric bonding cable. To reduce the surge impedance of the system it is common practice to use a concentric bonding cable having an inner conductor connected to one sheath and a outer connector connected to the other sheath, and the invention is especially applicable to systems in which a concentric bonding cable connected in this way is used. The bonding conductors connect the sheaths of the jointed cable lengths to the sheaths of other cable lengths at a similar joint or joints, usually through a link-disconnecting box and a surge diverter. It is advantageous for the bonding conductors both to be connected to appropriate parts of the joint structure at or near the same end of the joint enclosure and the invention relates especially to cross-bonding joints which provide this facility.

When the joint is a cross-bonding joint, the bonding conductors both enter the same one of the supplementary enclosures ("the first supplementary enclosure") through a suitable gland or glands. Within the first supplementary enclosure, one bonding conductor is connected to a first terminal connected to the sheath of the first cable length and the other is connected to a second terminal passing through the wall of the fluid-tight enclosure. A connecting lead passes from this terminal through the central part of the fluid-tight enclosure to the other end of the joint and is there connected to the sheath of the second cable length. The connecting lead is insulated from the central part of the fluid-tight enclosure and the second terminal is insulated from the first terminal and from the central part of the fluid-tight enclosure.

The invention will be further illustrated by a description by way of example with reference to the accompanying drawings of various forms of cross bonding cable joints in accordance with the invention. The joints are for single core lead sheathed metal tape reinforced oil filled cables.

Figure 2:
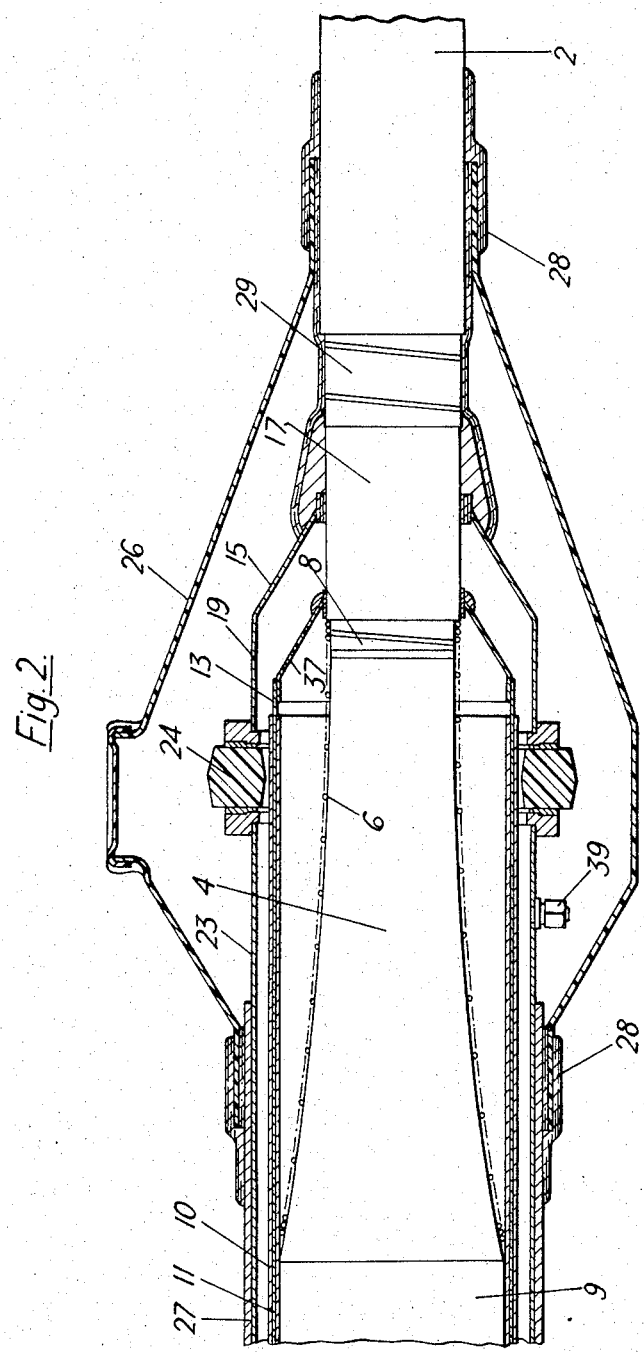
Figure 3:
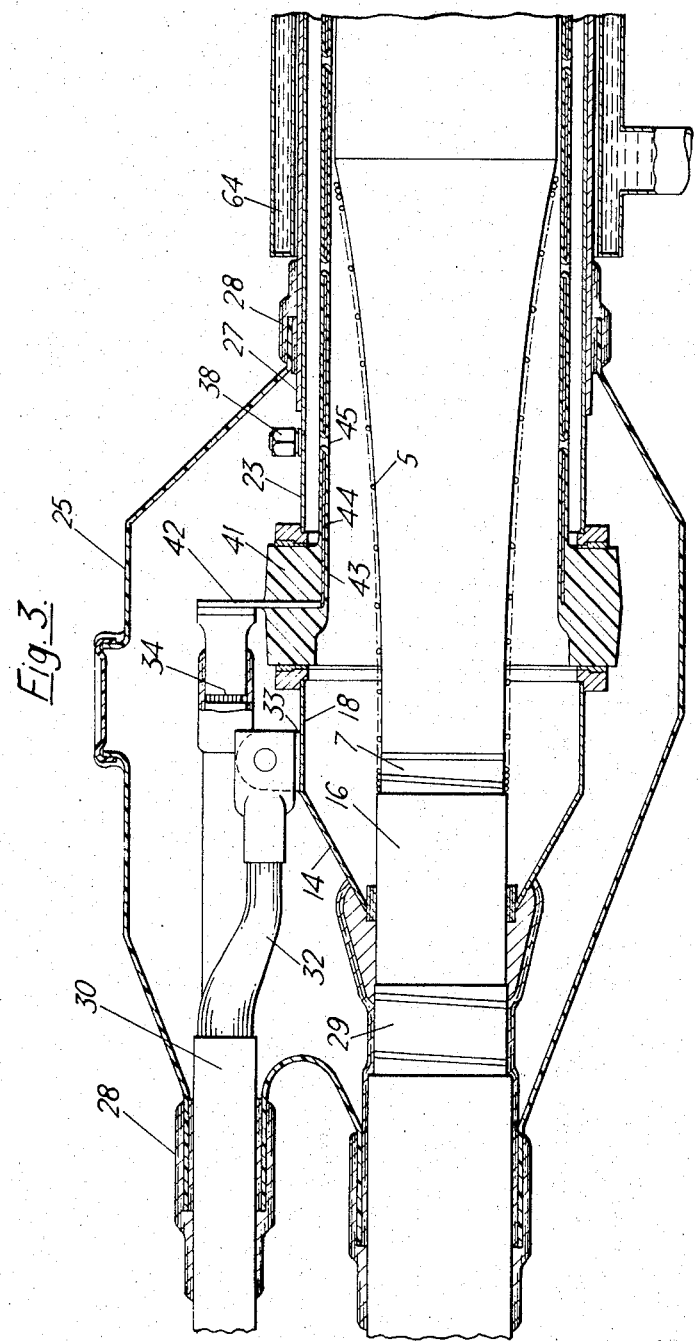
Figure 4:
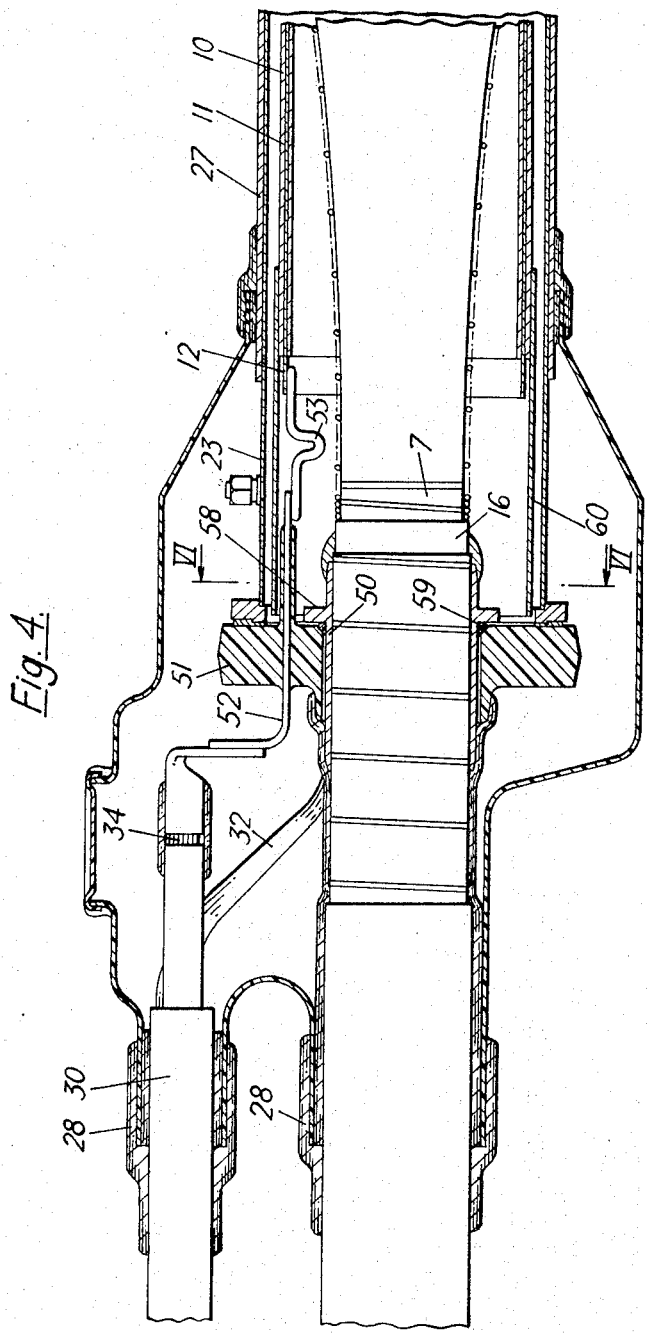
Figure 5:
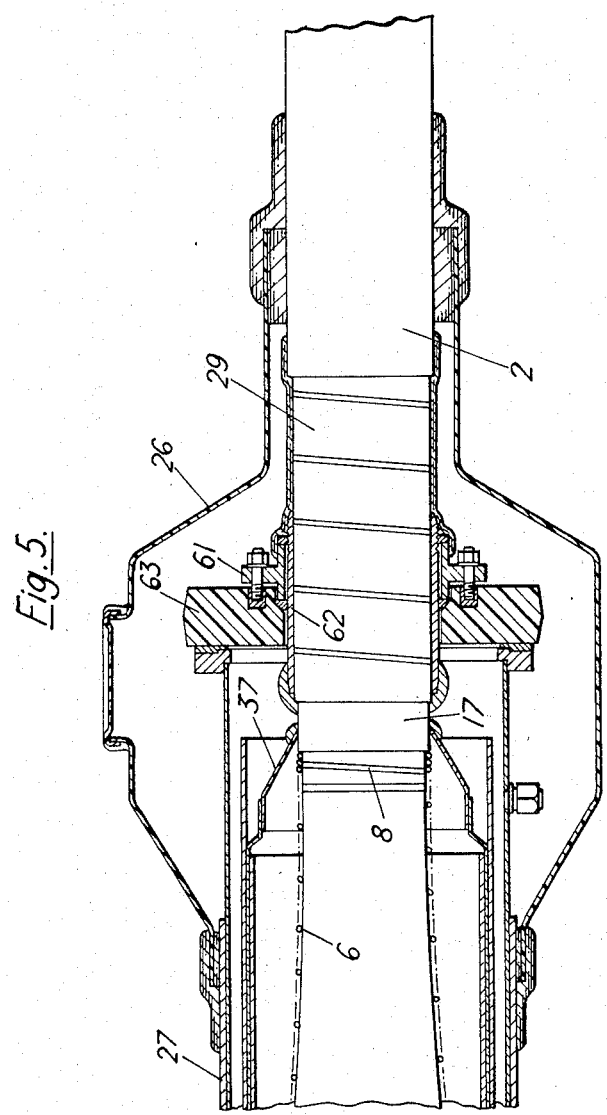
Figure 6:
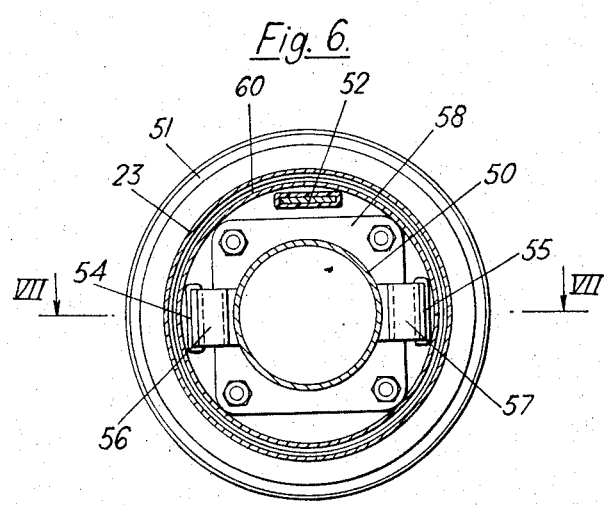
Figure 7:
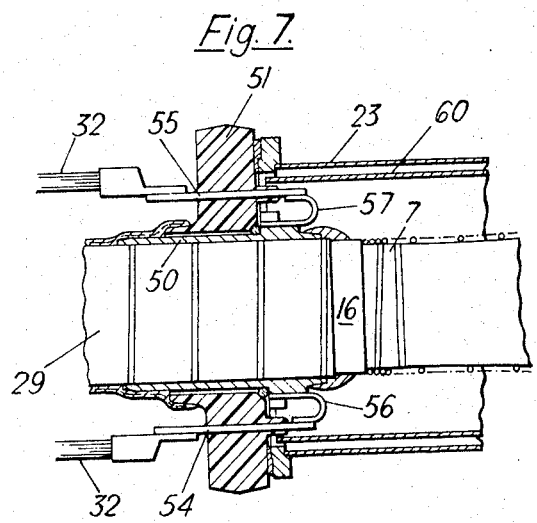

In the drawings:
FIGURES 1 and 2 are sectional elevations of the two ends respectively of one form of joint,
FIGURE 3 is a sectional elevation of part of one end of another form of joint,
FIGURES 4 and 5 are sectional elevations of the two ends respectively of a third form of joint,
FIGURE 6 is a section on line VI—VI of FIGURE 4, and
FIGURE 7 is a section on line VII—VII of FIGURE 6.

Referring to FIGURES 1 and 2 the conductors of the two lengths 1 and 2 of power cable are connected by a ferrule in the usual way and surrounded by built up insulation, the tapered end parts 3 and 4 of which are provided with stress screens 5 and 6 of lead wire connected to the dielectric screens 7 and 8, in accordance with normal practice. The central part 9 of the built up insulation is cylindrical and not provided with a directly applied screen, it fits into a tubular paper roll 10 which projects over the screened tapering end part 3 and 4 of the built up insultaion. Within the paper roll, equidistant from its inner and outer surfaces, is a co-axial tubular perforated metal screen 11 which projects at 12 and 13 a short distance from the ends of the roll and forms a connecting lead.

The fluid-tight enclosure of the joint is a tubular metal structure divided transversely into four parts as follows. Two end parts of the enclosure each comprise a tapering part 14, 15, which tapers down to the sheath diameter and is plumbed to the sheath 16, 17 of one of the cable lengths, and a short cylindrical part 18, 19 supported at the larger end of the tapering part. The end part 14, 18 is connected by an insulating ring 20 in the manner described in U.K. Letters Patent No. 882,870, to a short tubular part 21, hereinafter referred to as an "island" part, which is of the same diameter as the adjacent cylindrical part 18 of the end part. In this method of connection, the two tubular parts (18, 21) to be joined are flanged and an annulus of rigid insulating material is located between the flanges. One of the tubular parts is clamped to one end face of the annulus by means of nuts and studs or headed screws, which studs or screws pass through apertures in the flange and engage screw threaded holes in the annulus, the other tubular part is similarly clamped to the other end face of the annulus, and a sealing ring, gasket or other sealing means is interposed between each end face of the annulus and the neighbouring flange. The island part 21 is connected at its other end by a second insulating ring 22 to a central tubular part 23 which is also of the same diameter as the cylindrical part 18 of the end part. The second end part 15, 19 is identical with the first end part 14, 18 and is similarly connected to the opposite end of the central part 23 by a third insulating ring 24, its tapering part 15 being plumbed to the sheath 17 of the other cable length 2.

Two supplementary enclosures 25, 26 at the ends of the joint are both of insulating material and may be filled with any suitable compound, for example bitumen or a hard setting compound. The first supplementary enclosure 25 surrounds both the first end part of the fluid-tight enclosure, the island part, and the adjacent end of the central part, and is supported at one end on the serving of the first cable length 1 and at the other end on a corrosion resistant covering 27 on the central part 23, adjacent its point of connection to the island part 21. The enclosure 25 is sealed to these parts by sealing tape 28.

The second supplementary enclosure 26 is similarly supported between the opposite end of the central part 23 and the serving of the second cable length 2 and it surrounds the second end part. The plumbs by which the end parts of the fluid-tight enclosure are secured to the cable sheaths 16, 17 also secure the reinforcing tapes 29 to the sheaths.

A concentric bonding cable 30 passes through a gland 31, which it is sealed by tape 28, into the first supplementary enclosure 25 and the bunched wires of its outer conductor 32 are connected to a lug 33 on the first end part of the fluid-tight enclosure. The inner conductor 34 of the bonding cable is connected to a terminal lug 35 mounted on and passing through the island part 21 of the fluid-tight enclosure. The inner end of the terminal 35 is connected by a flexible strip 36 to the projecting end 12 of the perforated metal screen 11 embedded in the paper roll 10. The other projecting end 13 of the perforated screen 11 is connected to and supported by a perforated tapering metal end bell 37, plumbed to the second cable sheath 17 at the opposite end of the joint and arranged within but spaced from the second end part 15, 19 of the fluid-tight enclosure.

An oil inlet 38 is provided at the first end of the central part 23 of the enclosure within the first supplementary enclosure 25 and a similar inlet 39 is provided at the second end within the second supplementary enclosure 26, diametrically opposite, with respect to the cable axis, to the first inlet. It will be seen that oil passing through these inlets will enter the fluid-tight enclosure between the wall of the central part 23 and the outer surface of the paper roll 10 in which the tubular lead 11 is embedded.

The central part 23 of the fluid-tight enclosure may, if desired, be earthed but this is not essential since the joint is fully screened by the lead wire screens 5 and 6 at the ends of the built up insulation and the perforated tubular connecting lead 11 which overlaps these screens.

The second form of joint, shown in FIGURE 3, differs from the first form described above in that the island part of the fluid-tight enclosure and the two insulating rings by which it is mechanically connected to but insulated from the first part and the central part of the enclosure, are replaced by a single insulating ring 41 through which passes a terminal 42 for connecting the inner conductor 34 of the bonding cable 30 to the tubular connecting lead. The same references are used as in FIGURES 1 and 2 where applicable.

A second modification is that the paper roll is replaced by a tubular body 43 of synthetic resin in which the perforated tubular connecting lead 44 is embedded. This tubular body is bonded directly to the inner surface of the insulating ring 41 which replaces the island part. As in the first example the lead 44 may be supported at its opposite end by an end bell plumbed to the cable sheath 17. In this case however the end bell is preferably partly re-entrant and flexible to allow for expansion of the tubular body. The tubular body has perforations 45 coinciding with perforations in the tubular metal lead 44, to allow for passage of oil. As in FIGURE 2 the end bell is similarly perforated.

In the third example shown in FIGURES 4–7 the end part of the fluid-tight enclosure at the first end of the joint consists of a flanged tubular metal part 50, fitting over and plumbed to the cable sheath 16, and a ring 51 of insulating material which both provides a support for the central part 23 of the enclosure and forms an end wall of the enclosure. A terminal 52 passes through the ring shaped insulating end wall 51 and is connected to the inner conductor 34 of the bonding cable. The terminal 52 is connected at its opposite end by a flexible link 53 to the end 12 of the tubular connecting lead 11.

Two terminals 54 and 55 (FIGURES 6 and 7) for the outer conductor 32 of the cable 30 also pass through the ring 51 and are connected by links 56, 57 to the flanged tubular end part 50 of the fluid-tight enclosure that is plumbed to the cable sheath 16. As can be seen in FIGURE 7, the wires of the outer conductor are bunched in two groups for connection to the terminals 54 and 55. The insulating ring 51 is bolted to a flange 58 on the tubular metal part 50 and the joint between the tubular part 50 and the insulating ring 51 is sealed as by an O-ring 59. A preformed paper roll 60 insulates the central part 23 of the enclosure from the terminals 52, 54, 55 and links 53, 56, 57.

At the opposite end of the joint, there is a similar flanged tubular part plumbed to the cable sheath but in this case the flange 61 is adjustable with respect to a tubular part 62 and supports an insulating ring 63 on its side nearer the joint. The insulating ring 63 forms an end wall of the fluid-tight enclosure and supports the end of the central part 23 of the enclosure. The tubular connecting lead 11 is in the form described with reference to FIGURES 1 and 2.

In any of the examples described the outer surface of the central part of the fluid-tight enclosure, which is provided with a corrosion resistant covering, can either be left otherwise uncovered and in direct contact with the surrounding soil or exposed to the atmosphere in a manhole so that it cools naturally or alternatively it may be forcibly cooled by means of a heat exchanger, for example in the form of an annular chamber or a coil of pipe through which cooling fluid such as water, is circulated. A heat exchanger in the form of a water jacket 64 is shown in FIGURE 3. The jacket 64 is in this case loosely fitted over the corrosion covering 27 but it will be appreciated the water jacket could itself, at least in part, provide the necessary corrosion protection for the central part 23 or even be incorporated in the central part. The central part could for example be made double walled, the annular space between its walls filled with a circulating cooling fluid, and the outer surface of the outer wall made corrosion resistant.

Since the connecting leads in the joints described by way of example extend over, although insulated from, the two stress screens applied to the built up insulation of the joint one at each end of the joint and connected one to each of the dielectric screens or sheaths of the two cable lengths, the leads form part of the joint screen.

The use of a tubular connecting lead also has the advantage that the surge impedance of the connection between the bonding cable and the sheath of the cable length at the opposite end of the joint to that through which the bonding cable enters is kept to a minimum.

The main advantage of the joint structure in accordance with the invention is that it allows the radial thickness of the thermally insulating material surrounding the cable conductors in the region of the jointing ferrule to be reduced in comparison with known joint structures.

What we claim as our invention is:

1. A corrosion resistant joint enclosure enclosing a joint between fluid impregnated metal sheathed power cables comprising a fluid-tight enclosure surrounding the conductor joint and being divided transversely into at least three parts, including a corrosion resistant central part and two end parts which electrically insulate the central part from the sheaths of the cables connected at the joint and are each sealed both to the central part and to one of the cable sheaths, and a corrosion resistant supplementary enclosure surrounding each of said end parts and sealed both to one of the cables and to the adjacent end of the central part of the fluid-tight enclosure.

2. A joint enclosure as claimed in claim 1 in which a heat exchanger surrounds at least part of the central part and the central part is made corrosion resistant insofar as it is not protected against corrosion by the heat exchanger.

3. A joint enclosure as claimed in claim 1 in which the central part is of metal and is provided with a corrosion resistant covering over at least that part not protected by the supplementary enclosures.

4. A joint as claimed in claim 1 in which each end part of the fluid-tight enclosure comprises a tubular metal part plumbed to the cable sheath and carrying an insulating ring acting as an end wall of the enclosure and the central part of the enclosure comprises a metal tube supported at its ends by said insulating rings.

5. A joint as claimed in claim 1 in which the supplementary enclosures are of insulating material.

6. A corrosion resistant joint enclosure enclosing a joint between fluid impregnated metal sheathed power cables comprising a fluid-tight enclosure surrounding the conductor joint and comprising a corrosion resistant central tubular metal part, two metal end parts each plumbed to one of the cable sheaths, and ring shaped insulating parts sealing the central part to and insulating it from the end parts; and a corrosion resistant supplementary enclosure surrounding each of said end parts and sealed both to one of the cables and to the adjacent end of the central part of the fluid-tight enclosure.

7. A joint as claimed in claim 6 comprising a bonding lead passing through the central part of the fluid-tight enclosure, a terminal at the first end of the joint passing through the ring shaped insulating part and connected to the bonding lead and, at the other end of the joint, means connecting the bonding lead to the cable sheath of the second cable length connected at the joint.

8. A corrosion resistant joint enclosure enclosing a joint between fluid impregnated metal sheathed power cables comprising a fluid-tight enclosure surrounding the conductor joint and divided transversely into at least three parts including a corrosion resistant central part and two end parts which electrically insulate the central part from the sheaths of the cables connected at the joint and are each sealed both to the central part and to one of the cable sheaths, a corrosion resistant supplementary enclosure for each of said end parts sealed both to one of the cables and to the adjacent end of the central part of the fluid-tight enclosure, a cable gland through which a bonding cable passes into the first of said supplementary enclosures, a first terminal connected to a conductor of said bonding cable within the first supplementary enclosure, means connecting said first terminal to the metal sheath of the first cable length, a second terminal connected to another conductor of said bonding cable within the first supplementary enclosure and passing through the wall of the fluid-tight enclosure, a lead passing through the central part of the fluid-tight enclosure and means connecting said lead to said second terminal and to the sheath of the second cable length.

9. A joint enclosure as claimed in claim 8 in which the bonding lead passing through the central part of the fluid-tight enclosure is tubular and is coaxial with the cable lengths connected at the joint.

10. A joint enclosure as claimed in claim 9 comprising insulation for said bonding lead located on both its inner and its outer surfaces and in which said lead is located between the central part of the fluid-tight enclosure and a body of built-up insulation applied to the joint.

11. A joint enclosure as claimed in claim 9 applied to a cable joint in which tapering stress screens are applied to the end of built-up insulation on the cable conductors and in which the bonding conductor overlaps and is insulated from said screens, to act as a screen over the central part of built-up insulation applied to the joint.

12. A joint enclosure as claimed in claim 9 in which the bonding lead is perforated.

13. A joint as claimed in claim 8 in which each end part of the fluid-tight enclosure comprises a tubular metal part plumbed to the cable sheath and carrying an insulating ring acting as an end wall of the enclosure and the central part of the enclosure comprises a metal tube supported at its ends by said insulating rings.

14. A joint as claimed in claim 8 in which the supplementary enclosures are of insulating material.

No references cited.

DARRELL L. CLAY, *Primary Examiner.*